June 30, 1936.  C. E. FERREE ET AL  2,045,704

OPHTHALMIC INSTRUMENT

Filed March 25, 1933   2 Sheets-Sheet 1

CLARENCE ERROL FERREE
GERTRUDE RAND FERREE
INVENTORS

BY *G. H. Ellestad*

ATTORNEY

June 30, 1936.　　C. E. FERREE ET AL　　2,045,704
OPHTHALMIC INSTRUMENT
Filed March 25, 1933　　2 Sheets-Sheet 2
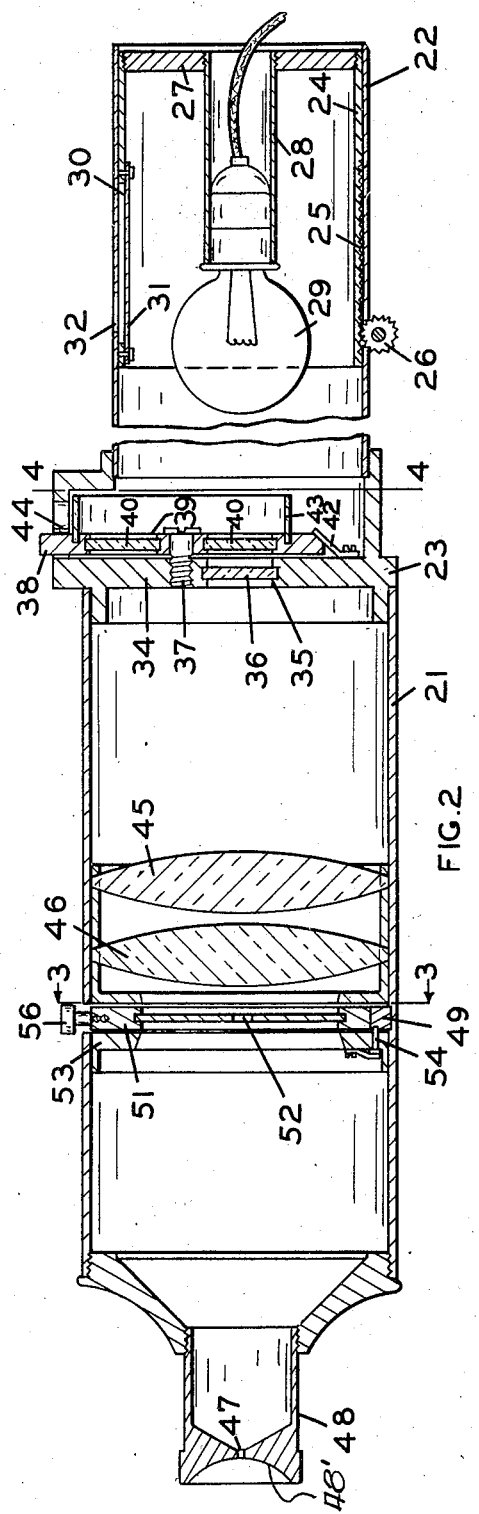
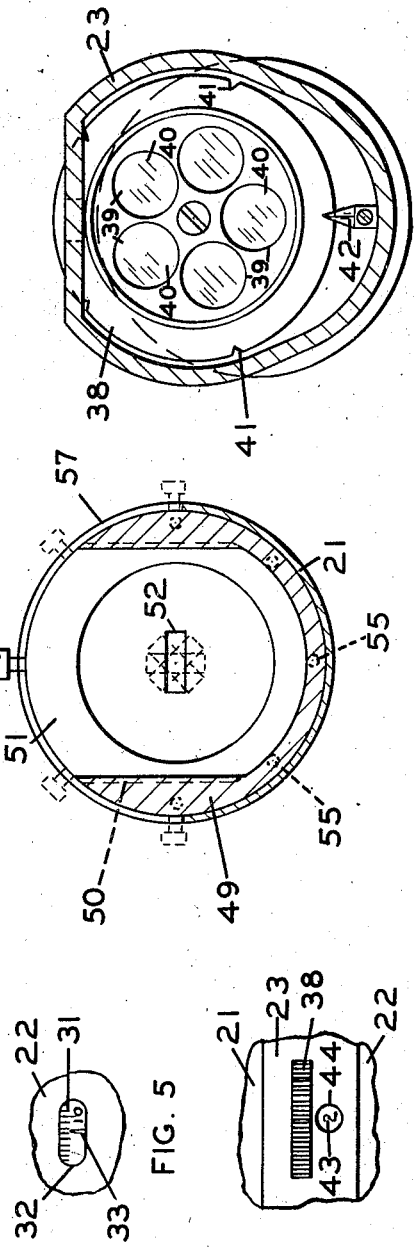
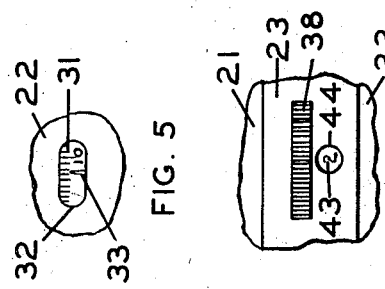
CLARENCE ERROL FERREE
GERTRUDE RAND FERREE
INVENTORS
BY *J. A. Ellestad*
ATTORNEY Patented June 30, 1936

2,045,704

UNITED STATES PATENT OFFICE 2,045,704

OPHTHALMIC INSTRUMENT

Clarence Errol Ferree and Gertrude Rand Ferree, Baltimore, Md.

Application March 25, 1933, Serial No. 662,743

11 Claims. (Cl. 88—20)

This invention relates to ophthalmic instruments and more particularly it has reference to such types of instruments as are used for testing, measuring or checking the light and color senses as well as the light, dark and color adaptations.

One of the objects of our invention is to provide an improved instrument for testing, measuring or checking the light and color senses and the light, dark and color adaptations. Another object is to produce an instrument of the type described in which variably illuminated test and pre-exposure fields can be selectively provided. Still another object is to provide an instrument of the type described in which all of the light in the test and/or pre-exposure fields can be measured and directed into the eye under test. A further object is to provide an instrument of the type described having means whereby acuity can be tested, over a wide range of illumination, independent of the refractive system of the eye. Other objects are to provide in an instrument of the type described a viewing aperture of substantially one and a half millimeters in diameter; a single light source for illuminating the test and/or pre-exposure fields; independent means for varying the illumination on the test and/or pre-exposure fields and means for indicating the illumination in the fields; diaphragm means for selectively providing various test fields; and means for checking the intensity of the light source. Other objects and advantages reside in certain novel features of construction, arrangement and combination of parts as will hereinafter be more fully described and pointed out in the appended claims.

Referring to the drawings:

Fig. 2 is a vertical sectional view taken through the casing of the instrument.

Fig. 3 is a sectional view taken on line 3—3 of Fig. 2.

Fig. 4 is a sectional view taken on line 4—4 of Fig. 2.

Figs. 5 and 6 are fragmentary detail views showing the scale means for indicating the intensity of illumination.

Figure 1:
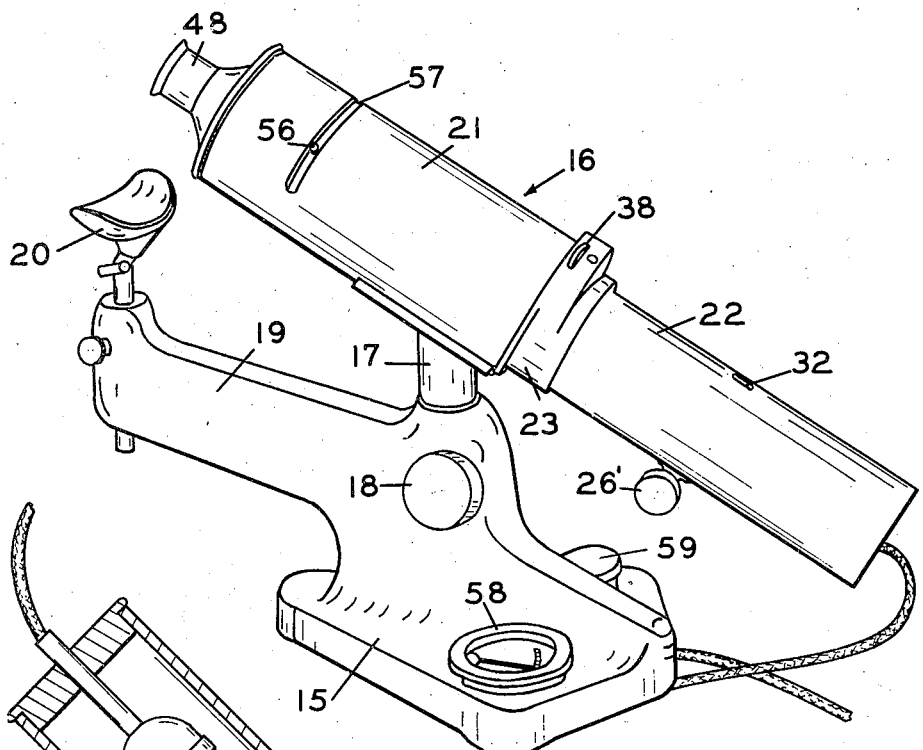
Fig. 1 is a perspective view of an instrument embodying our inventions.

A preferred embodiment of our invention is illustrated in the drawings wherein 15 indicates the supporting base which is preferably formed of a single casting. The housing, indicated generally at 16, is mounted in fixed angular relation to a rod 17 which is slidably mounted in base 15 for vertical adjustment and adapted to be secured in adjusted position by means of a clamping screw, not shown, operated by knob 18. The base 15 has a forwardly projecting portion 19 on which a chin rest 20 is mounted for vertical and angular adjustments.

The housing 16 comprises a front casing portion 21 and a rear casing portion 22 both secured to an intermediate member 23. Movably mounted within casing 22 is tubular member 24 having a rack portion 25 cooperating with a rotatable pinion 26 which can be turned by knob 26' so as to move the tubular member 24 back and forth within casing 22. The tubular member 24 is closed at one end by a plate 27 carrying a support 28 on which a light source, such as the incandescent lamp 29, is mounted. The upper side of the tubular member 24 is provided with a slot 30 which is covered by a translucent scale member 31. In the top of casing 22 there is provided an opening 32 having a fixed index 33 which cooperates with the trans-illuminated scale 31 to indicate the position of the lamp 29 for a purpose to be hereinafter described.

The intermediate member 23 is provided with a wall 34 having a centrally disposed opening 35 in which is mounted a diffusion disk such as a plate of opal glass 36. Rotatably mounted on the wall 34, by means of screw 37, is a disk 38 having a plurality of spaced openings 39 in which are mounted suitable neutral or colored filters 40 of different densities. The disk 38 is provided with a plurality of circumferentially spaced notches 41 which are adapted to cooperate with a click spring 42 as the disk is rotated to selectively position any desired filter 40 in registration with the opal glass 36. Fixedly secured to the disk 38 is a translucent cylindrical scale member 43 which is illuminated by lamp 29 so that numbers indicating the filter densities can be read through the opening 44 in member 23, as will hereinafter be described.

Mounted within casing 21 are the two double convex lenses 45 and 46 which cooperate to image the illuminated opal glass 36 at a point which is slightly beyond the viewing aperture 47 in the concavity 48' of eye-piece 48 carried at the forward part of casing 21. Lens 45 acts to collimate the light rays coming from the illuminated opal glass 36 and lens 46 serves to focus these rays substantially at the aperture 47 so that an image of the illuminated glass plate 36, which can be regarded as a secondary source, is formed substantially at the pupil of an eye which is positioned at the eye piece 48. The aperture 47 preferably has a diameter of about 1.5 millimeters—which is less than the diameter of the pupil of the eye and the concavity 48' enables the patient to place his eye close to the aperture. This renders the results independent of individual variations in size of pupil and at the same time independent of the refractive condition of the eye.

Rotatably mounted within the casing 21, directly in front of lens 46, is the plate 49 having guideways 50 adapted to slidably receive a diaphragm plate 51 provided with a centrally disposed aperture 52 of any desired size or shape. A bushing 53 mounted within casing 21 carries spring pressed pin 54 which is adapted to cooperate with the spaced depressions 55 on plate 49 as the latter is turned together with the diaphragm 51 by means of the knob 56 which projects through slot 57 in casing 21. The diaphragm opening 52 can thus be selectively set in a plurality of angular positions.

In determining the light minimum, the patient is seated before the instrument with his eye at the viewing aperture 47. The diaphragm plate 51 is withdrawn, and the light source 29 and filters adjusted so that the patient sees a field completely filled with light. The patient gazes at this field for 3 minutes in order to sensitize the eye to a constant illumination. One of the denser filters 40 is positioned opposite opal glass 36, a field diaphragm 51 is put in place and the lamp 29 is moved rearwardly until the field is no longer visible to the patient. The lamp 29 may then be moved forwardly until the field again becomes visible to the patient. In this manner, it is possible to vary the illumination on the opal glass 36 so that the test field is just discernible to the patient. The diaphragm opening 52 may be turned to different angular positions without knowledge of the patient thereby providing an objective check on the correctness of the patient's judgment.

The brightness or amount of light in the field can be determined from the transilluminated scales 31 and 43. A suitable calibration curve for the instrument is determined by actually measuring the light which passes out through the aperture 47. The calibration can be made in terms of foot candles or lamberts or any other suitable units. In order to insure constant performance of the lamp 29, a milliammeter 58 and an adjustable rheostat 59 are arranged in the circuit of the lamp so that the lamp can be operated at a predetermined amperage.

Figure 7:
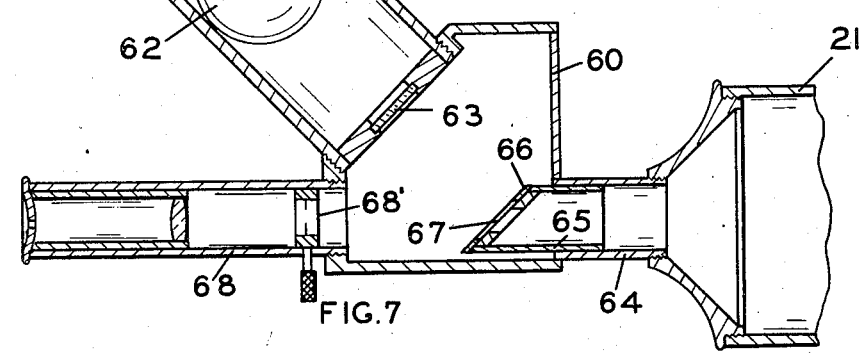
Fig. 7 is a sectional view showing our checking standard in position on the instrument.

In spite of the fact that the lamp 29 can be operated at a certain amperage, it is essential to check the illumination which it produces since the efficiency does not always remain constant. In order to do this easily and conveniently we provide a checking standard unit which can be substituted for the eye piece 48 on casing 21 as shown in Fig. 7. This unit comprises a casing 60 to which is attached the tube 61 carrying a standard lamp 62, of known candle power, and a diffusing glass plate 63. Casing 60 is also provided with a tube 64 which screws into the front end of casing 21 instead of the eye piece 48. Within the tube 64 is mounted a cylinder 65 having an inclined plate 66 provided with a central aperture 67. With the checking unit in position as shown in Fig. 7, light from the instrument passes through aperture 67 while light from the standard lamp 62 falls on the plate 66 thereby bringing the two fields in juxtaposition to be viewed through the eye piece tube 68. The intensities of the two fields can thus be compared and any necessary adjustments made in the current rate for the lamp 29 in the instrument. The eye piece tube 68 is provided with an iris diaphragm 68' so that a large pre-exposure field or a smaller test field can be quickly provided for a purpose to be hereinafter described. The inner surface of the wall of casing 60 opposite the eye piece tube should have the same reflecting power as plate 66.

In determining the light difference the checking standard is positioned on the instrument as shown in Fig. 7. Since the illumination provided by the standard lamp 62 is known, the operator adjusts the instrument so that, according to scales 31 and 43, the illuminations of the checking standard unit and the instrument are the same. The diaphragm 68' is opened widely so there is provided a relatively large, uniformly matched, illuminated field which the patient sees upon looking into the eye piece 68. The patient is directed to look at such a matched field for a fixed period of time in order to sensitize the eye. The diaphragm 68' is then partially closed so as to provide a small test field and the patient is directed to move lamp 29 by turning knob 26' until he just notices that the two portions of the photometric field are of different intensities. He is then directed to move the lamp in the opposite direction until he again just notices an intensity difference between the two portions of the field. The difference between the scale readings for the match point and the just noticeable difference point is a measure of the patient's light difference.

Figure 8:
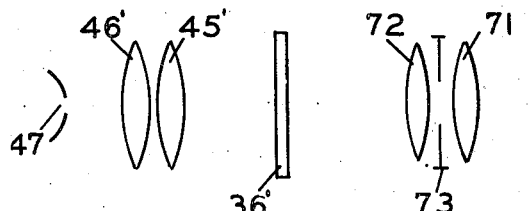
Fig. 8 is a schematic view of a modified form of optical system.

A modified form of the optical system of our instrument is shown diagrammatically in Fig. 8 wherein 29' indicates the light source adapted to illuminate a diffusing plate 70. The lens 71 collimates the light rays and lens 72 focuses them onto a diffusing screen 36'. Lenses 45' and 46' cooperate to image the illuminated glass diffusing plate 36' at a point which is substantially at the pupil of an eye placed at aperture 47. Between lenses 71 and 72 there is positioned an iris diaphragm 73 which can be adjusted so as to vary the intensity of the illumination on plate 36'.

From the foregoing it will be apparent that we are able to attain the objects of our invention and provide an instrument which can be conveniently used for testing light and color sense and light, dark and color adaptations. Diaphragms having openings of various shapes and sizes can, of course, be selectively inserted in guideways 50. A diaphragm having the well known broken circle opening can, for example, be positioned in the guideway 50. With such an object, the instrument can be used for testing acuity, independent of the refractive system of the eye, over a wide range of illumination. In testing the color sense, the filters 40 are suitably colored. By using a viewing aperture of substantially 1.5 millimeters in diameter the results are rendered independent of the refractive system of the eye under test. Through the use of our optical system for focusing the light in the pupil of the eye, no light is wasted and hence ample range of intensity can be provided by a single light source. Changes from pre-exposure fields to a test field can be effected with a minimum amount of time. The instrument can be conveniently operated in a darkened room since the scales are transilluminated.

Various modifications can obviously be made without departing from the spirit of our invention.

We claim:

1. An ophthalmic instrument for testing light sense comprising a closed casing having a viewing aperture, means within said casing for selectively and successively providing illuminated pre-exposure and test fields, means for directing all of the light in said fields into an eye placed at said aperture and means for measuring the amount of light which enters the eye.

2. An instrument of the type described comprising a casing having a viewing aperture, a light source within said casing, lens means for imaging said source at the pupil of an eye positioned at said aperture and means for selectively positioning a diaphragm adjacent to said lens means to limit the size of field.

3. An instrument of the type described comprising a casing having a viewing aperture, a light source within said casing, means for varying the intensity of said source, lens means for imaging said source at the pupil of an eye placed at said aperture, diaphragm means adjacent to said lens means for limiting the size of field and means for indicating the amount of light which enters the eye.

4. An instrument of the type described comprising a casing having a viewing aperture at one end thereof, a light source mounted at the other end of said casing, light diffusing means mounted between said source and aperture, means for varying the intensity of illumination on said diffusing means and lens means for collimating light rays from said diffusing means and focusing them substantially at said aperture.

5. An instrument of the type described comprising a casing having a viewing aperture at one end thereof, a light source mounted at the other end of said casing, light diffusing means mounted in said casing between said source and aperture in position to receive light rays from said source, means for varying the illumination on said diffusing means, lens means for collimating light rays from said diffusing means and focusing them substantially at said aperture and means for selectively positioning a diaphragm adjacent to said lens means to limit the size of field.

6. An instrument of the type described comprising a casing having a viewing aperture, a light source movably mounted at the other end of the casing, a light diffusing member positioned between said aperture and light source, means for imaging said member on an eye placed at said aperture, and means for varying the illumination on said diffusing member, said last named means comprising mechanism for varying the distance between said source and member and light modifying filters positioned between said source and member.

7. An instrument of the type described comprising a casing, means for providing an illuminated field within said casing and means on said casing for selectively holding either an apertured eye piece or a checking unit in position to receive light rays from said field, said unit comprising means for checking the illumination of said field with the illumination of a standard light source.

8. An instrument of the type described comprising a casing having a viewing aperture, a single light source mounted at the other end of the casing, a light diffusing member positioned between said source and aperture, means for imaging said member at the pupil of an eye placed at said aperture and means for varying the intensity of illumination on said member, said last named means comprising two lenses positioned between said source and member and a diaphragm positioned between said lenses.

9. An instrument of the type described comprising a casing having a viewing aperture, a light source at the other end of said casing, a light diffusing member positioned between said source and aperture, means for imaging said member at the pupil of an eye placed at said aperture and means for varying the intensity of illumination on said member, said means comprising lens means positioned between said source and member and diaphragm means positioned adjacent to said lens means.

10. In an instrument of the type described the combination of a housing, means within said housing for providing an illuminated field, means for varying the illumination on said field, a casing, means within said casing for providing an illuminated field in juxta-position to said first named field and means for viewing the two juxta-posed fields, said last named means comprising lens means and adjustable diaphragm means for selectively limiting the size of field.

11. A light sense tester having in combination means for producing two contiguous illuminated fields, means for varying the illumination on one of said fields, means for viewing said two contiguous fields and diaphragm means for selectively varying the portion of said fields which are visible through said viewing means.

CLARENCE ERROL FERREE.
GERTRUDE RAND FERREE.